(12) United States Patent
Ricalde

(10) Patent No.: US 6,996,915 B2
(45) Date of Patent: *Feb. 14, 2006

(54) TAPE MEASURE APPARATUS WHICH CAN BE USED AS A MARKING GAUGE AND/OR COMPASS

(76) Inventor: Paul Ricalde, 134 Richland Dr. South, Mandeville, LA (US) 70448

( * ) Notice: Subject to any disclaimer, the term of this patent is extended or adjusted under 35 U.S.C. 154(b) by 0 days.

This patent is subject to a terminal disclaimer.

(21) Appl. No.: 10/384,151

(22) Filed: Mar. 7, 2003

(65) Prior Publication Data

US 2003/0154617 A1    Aug. 21, 2003

Related U.S. Application Data

(63) Continuation-in-part of application No. 09/990,897, filed on Nov. 16, 2001, now abandoned, which is a continuation-in-part of application No. 09/561,062, filed on Apr. 28, 2000, now Pat. No. 6,497,050.

(60) Provisional application No. 60/370,118, filed on Apr. 4, 2002, provisional application No. 60/249,777, filed on Nov. 17, 2000.

(51) Int. Cl.
  *G01B 3/10* (2006.01)
  *B43L 9/04* (2006.01)
  *B25H 7/04* (2006.01)

(52) U.S. Cl. .................. 33/770; 33/27.03; 33/768; 33/668

(58) Field of Classification Search .............. 33/755, 33/757–761, 768, 770, 27.02, 27.03, 27.031, 33/27.032, 42, 668
See application file for complete search history.

(56) References Cited

U.S. PATENT DOCUMENTS

| | | | | |
|---|---|---|---|---|
| 1,986,551 A | * | 1/1935 | Anderson | 33/27.03 |
| 2,022,756 A | * | 12/1935 | Buck et al. | 33/766 |
| 2,354,756 A | * | 8/1944 | Keuffel et al. | 33/701 |
| 2,549,503 A | * | 4/1951 | McCully | 33/770 |
| 2,624,120 A | | 1/1953 | Mills | |
| 2,649,787 A | | 8/1953 | Kobayashi | |
| 2,934,827 A | * | 5/1960 | Barto | 33/27.03 |
| 3,120,059 A | * | 2/1964 | Quenot | 33/27.03 |
| 3,526,964 A | | 9/1970 | Clark, Jr. | |
| 3,744,134 A | * | 7/1973 | Zima, Jr. | 33/768 |
| 3,745,663 A | * | 7/1973 | Dodge | 33/759 |
| 3,823,481 A | | 7/1974 | Cahpin | |
| 4,023,277 A | | 5/1977 | Fizer | |

(Continued)

FOREIGN PATENT DOCUMENTS

KR    20-0265126    2/2002

OTHER PUBLICATIONS

Item shown in photographs attached as Exhibit A offered for sale in US on Dec, 13, 2000 (also included product instructions).

*Primary Examiner*—G. Bradley Bennett
(74) *Attorney, Agent, or Firm*—Garvey, Smith, Nehrbass & Doody, L.L.C.; Brett A. North

(57) ABSTRACT

An improved tape measure apparatus which can be used as a marking gauge and/or compass comprising a tape measure, an insert comprising a base, a guide attached to the base and generally parallel to graduated indicia markings of the rule blade when extended from the tape measure whereby the graduated markings of the tape measure's rule blade may be read. An alternative embodiment includes an insert enabling standard tape measures to be used as marking gauges and/or compasses.

57 Claims, 10 Drawing Sheets

U.S. PATENT DOCUMENTS

| | | | |
|---|---|---|---|
| 4,103,426 A * | 8/1978 | Robin | 33/27.03 |
| 4,574,486 A * | 3/1986 | Drechsler | 33/755 |
| 4,603,481 A * | 8/1986 | Cohen et al. | 33/768 |
| 4,748,746 A * | 6/1988 | Jacoff | 33/761 |
| 4,827,622 A * | 5/1989 | Makar | 33/770 |
| 4,890,393 A * | 1/1990 | St. Jean | 33/768 |
| 4,949,462 A | 8/1990 | Spencer | |
| 4,999,924 A | 3/1991 | Shields | |
| 5,016,360 A | 5/1991 | Starcevich | |
| 5,134,784 A * | 8/1992 | Atienza | 33/668 |
| 5,172,486 A * | 12/1992 | Waldherr | 33/770 |
| 5,189,801 A * | 3/1993 | Nicely | 33/42 |
| 5,295,308 A * | 3/1994 | Stevens et al. | 33/770 |
| 5,379,524 A | 1/1995 | Dawson | |
| 5,421,100 A | 6/1995 | Leore | |
| 5,430,952 A | 7/1995 | Betts | |
| 5,481,810 A | 1/1996 | Hastings et al. | |
| 5,606,803 A | 3/1997 | O'Sullivan | |
| 5,815,940 A * | 10/1998 | Valentine, Sr. | 33/770 |
| 5,842,284 A | 12/1998 | Goldman | |
| 6,032,379 A * | 3/2000 | Usami | 33/758 |
| 6,041,513 A | 3/2000 | Doak | |
| 6,497,050 B1 * | 12/2002 | Ricalde | 33/770 |

* cited by examiner

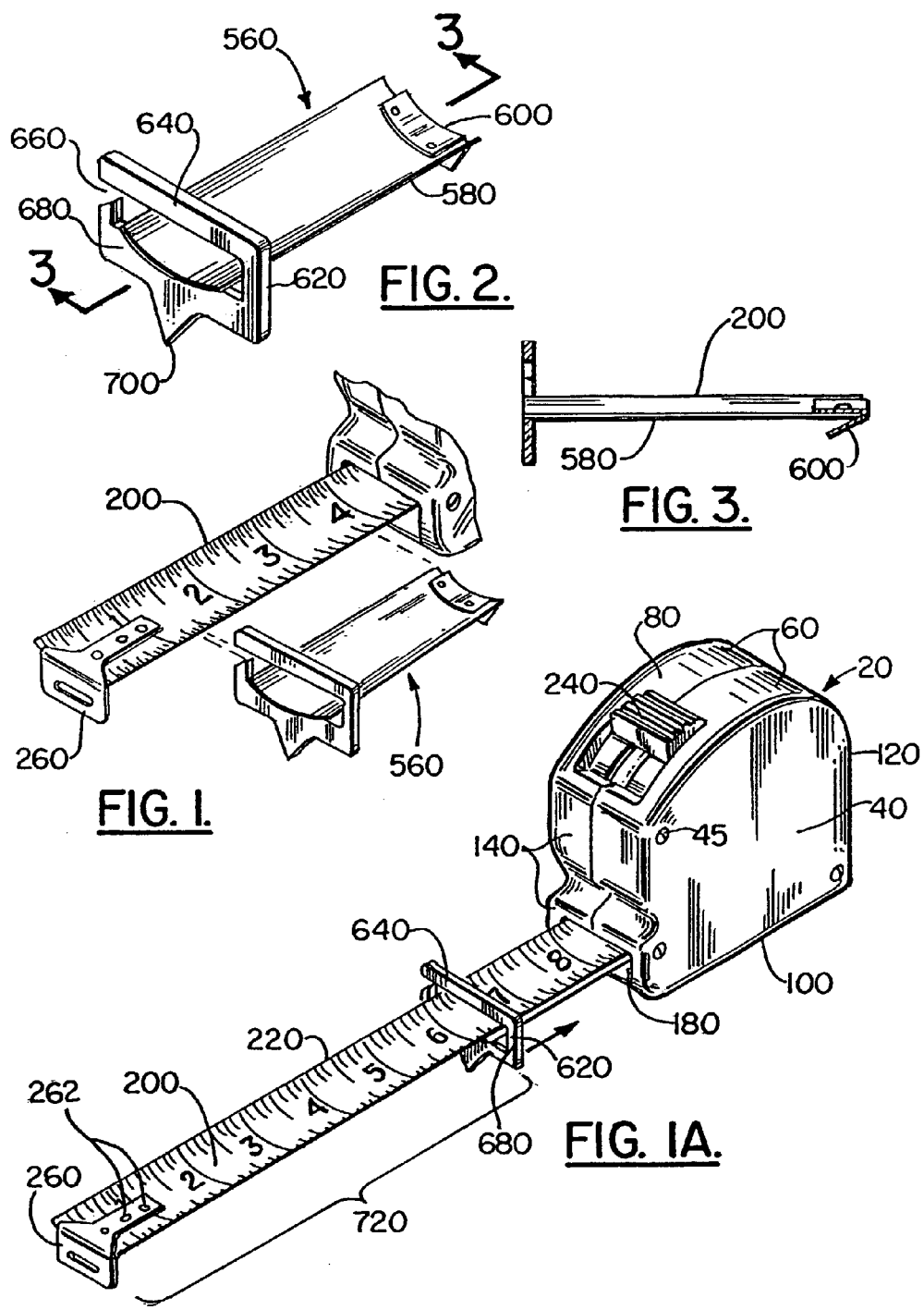

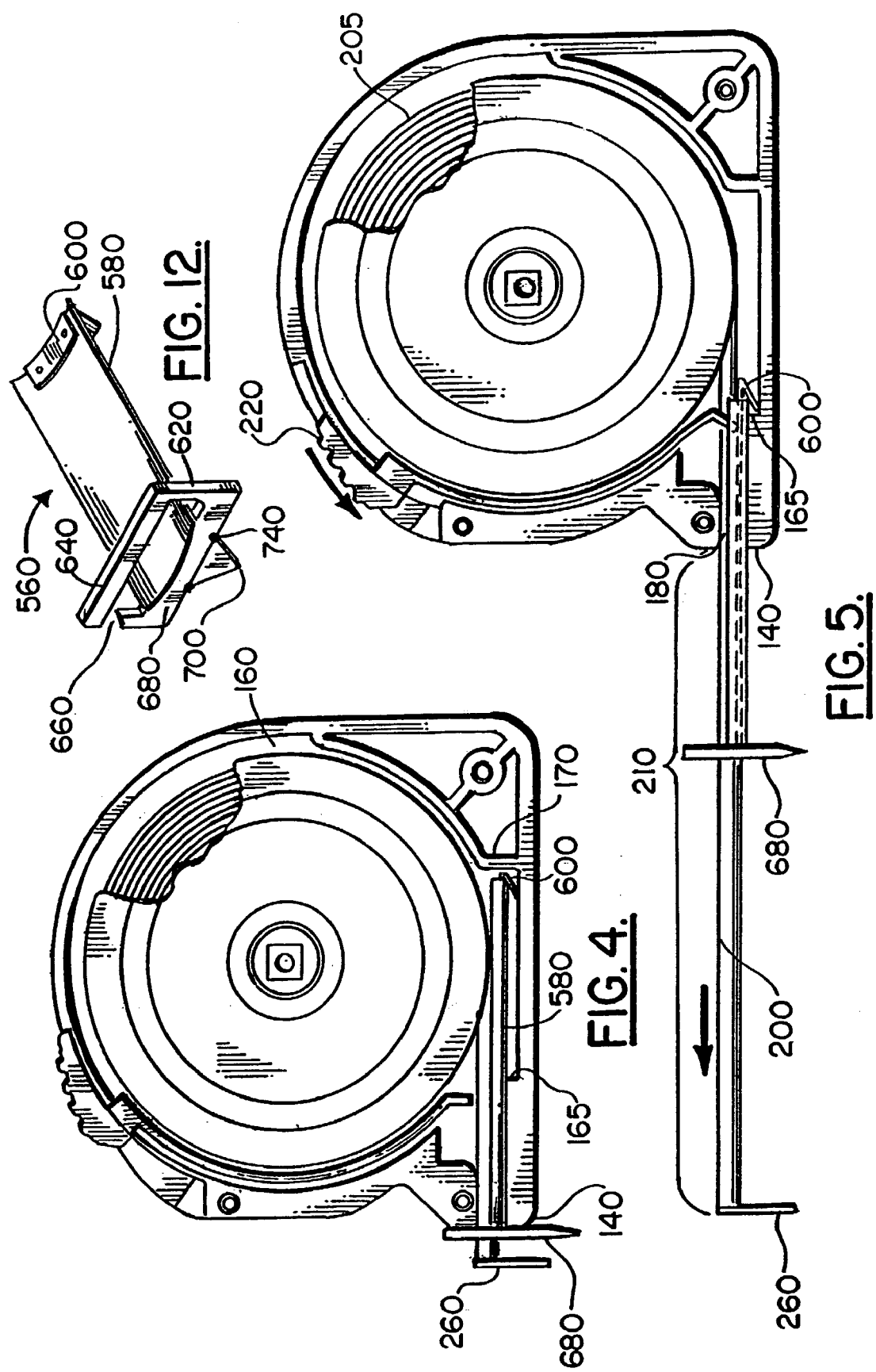

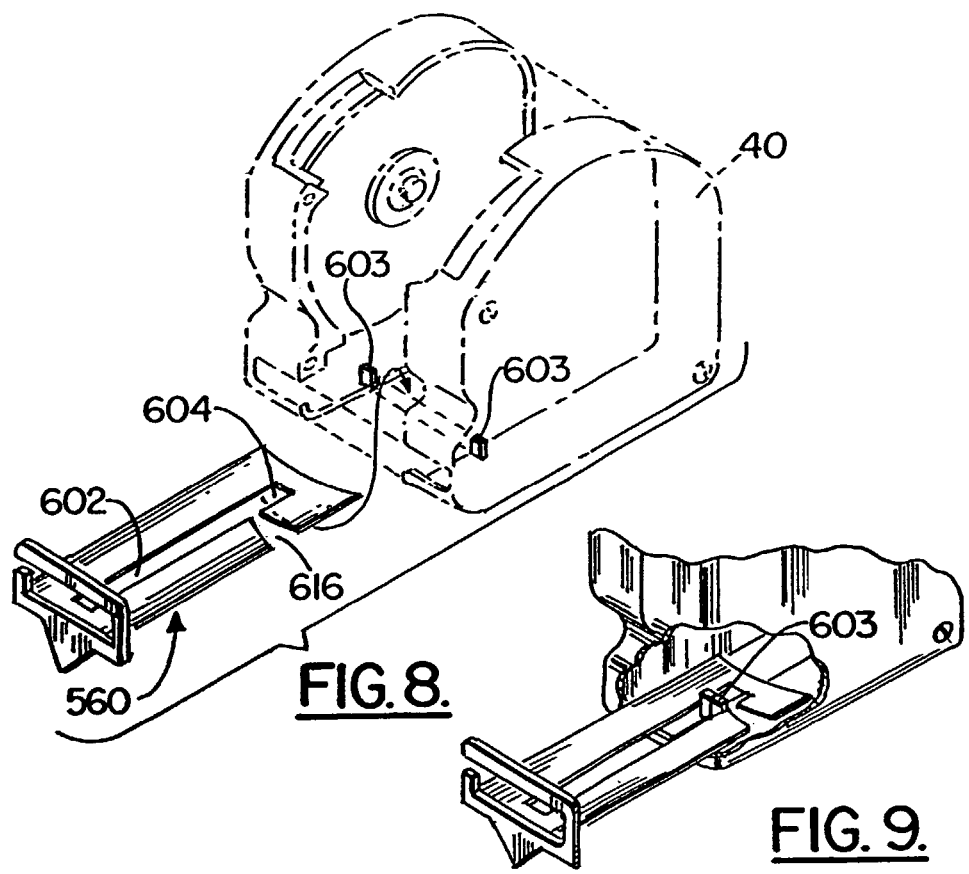
FIG. 8.
FIG. 9.
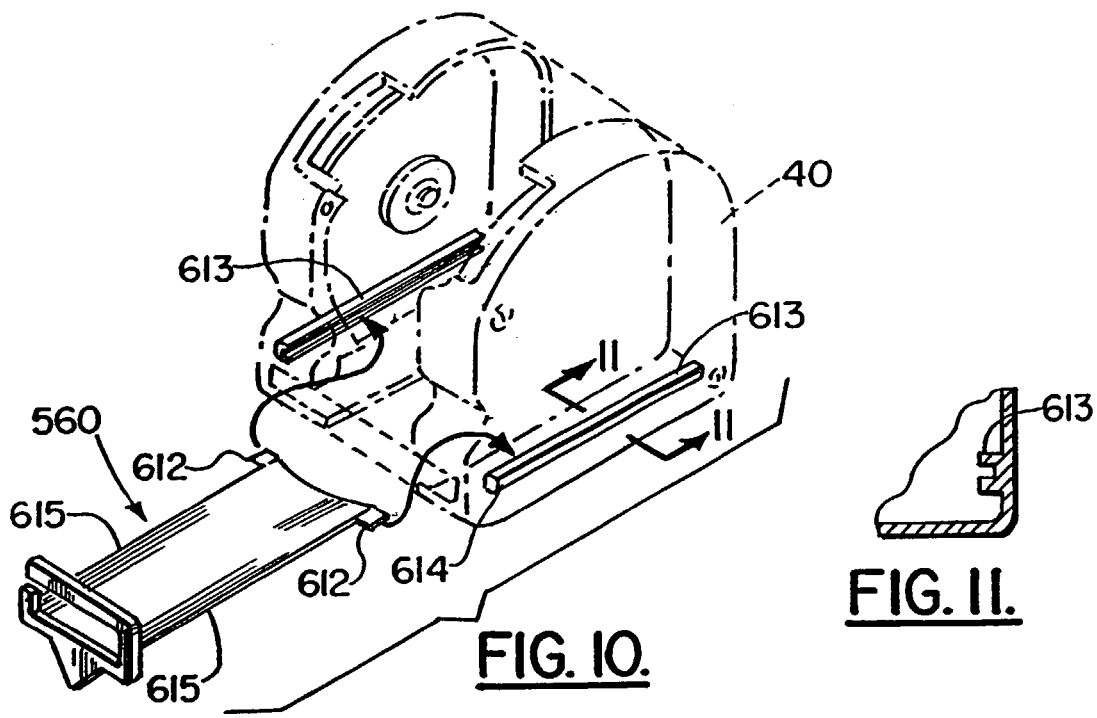
FIG. 10.
FIG. 11.

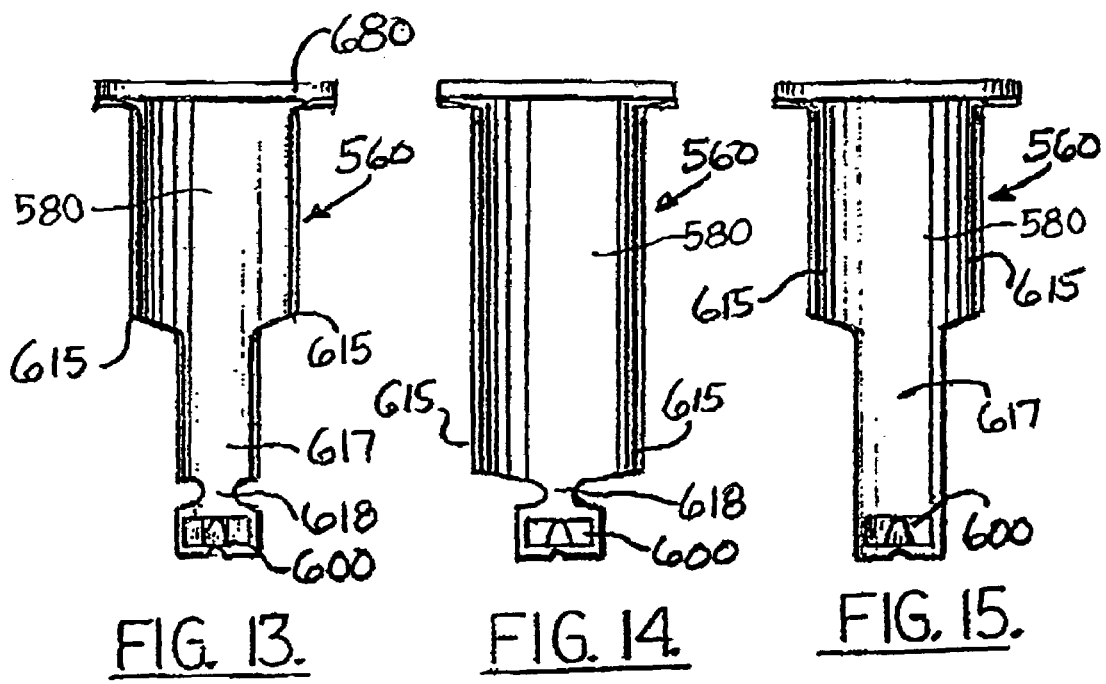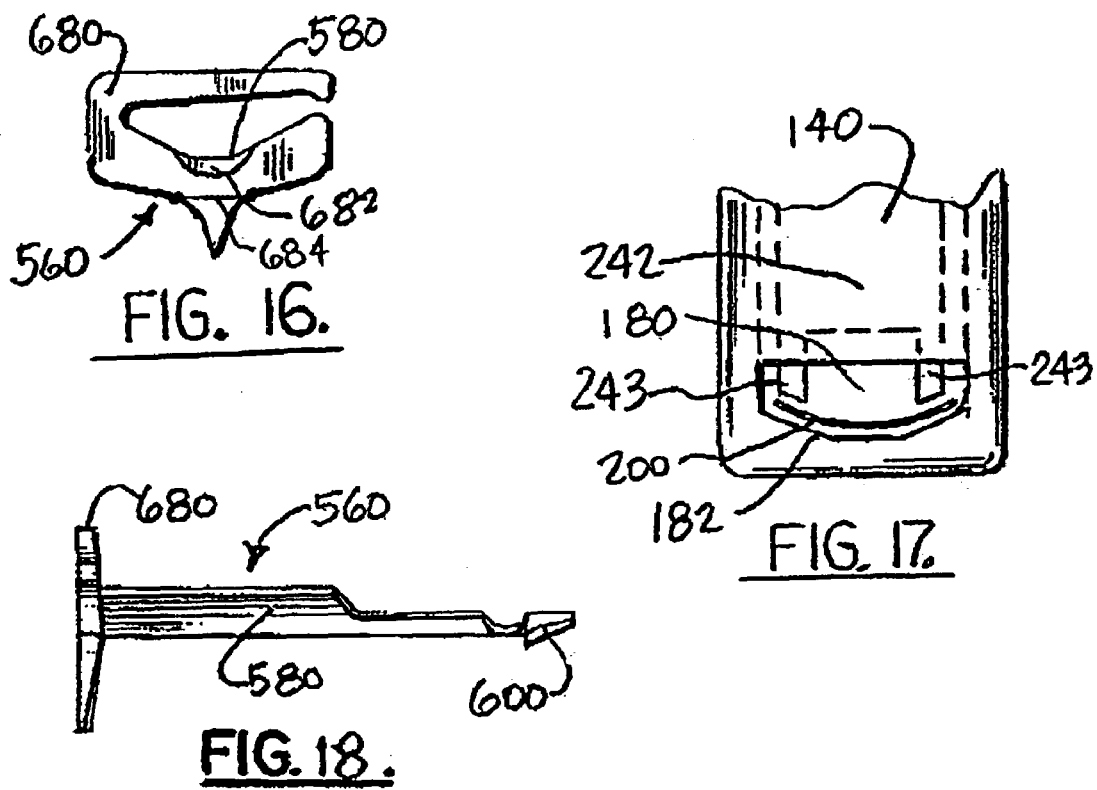

TAPE MEASURE APPARATUS WHICH CAN BE USED AS A MARKING GAUGE AND/OR COMPASS

CROSS-REFERENCE TO RELATED APPLICATIONS

This is a continuation-in-part of U.S. patent application No. 09/990,897, filed Nov. 16, 2001, now abandoned which was a continuation-in-part of U.S. patent application No. 09/561,062, filed Apr. 28, 2000 (which issued as U.S. Pat. No. 6,497,050 on Dec. 24, 2002).

Priority is hereby claimed to U.S. patent application No. 60/370,118, filed Apr. 4, 2002.

Priority is hereby claimed to U.S. patent application No. 09/990,897, filed Nov. 16, 2001.

Priority is hereby claimed to U.S. patent application No. 60/249,777, filed Nov. 17, 2000.

Priority is hereby claimed to U.S. patent application No. 09/561,062, filed Apr. 28, 2000.

U.S. patent application No. 60/370,118, filed Apr. 4, 2002 is incorporated herein by reference.

U.S. patent application No. 09/990,897, filed Nov. 16, 2001 is incorporated herein by reference.

U.S. patent application No. 60/249,777, filed Nov. 17, 2000 is incorporated herein by reference.

U.S. patent application No. 09/561,062, filed Apr. 28, 2000 is incoporated herein by reference.

REFERENCE TO A "MICROFICHE APPENDIX"

Not applicable

BACKGROUND OF THE INVENTION

1. Field of the Invention

The present invention relates generally to carpentry tools and, more specifically, to an improved tape measure apparatus which can be used as a marking gauge and/or compass.

2. General Background of the Invention

Standard tape measures include a length of tape wound a spool with a spring return mechanism so that after the tape is taken out of a housing, the spring return mechanism automatically retracts the tape into the housing. A locking mechanism, typically a sliding button, locks the tape for the purpose of reading the length of the deployed tape.

Numerous tape measures have been provided in prior art. For example, U.S. Pat. No. 2,624,120 to Mills; U.S. Pat. No. 4,574,486 to Drechsler; and U.S. Pat. No. 5,390,426 to Hull are illustrative of the prior art and incorporated herein by reference to show the conventional construction of tape measures. While these units may be suitable for the particular purpose to which they address, they would not be as suitable for the purposes of the present invention as heretofore described. Tape measures are well adapted for measuring distances but their utility is usually restricted to this single function.

Many instances arise where workpieces must be scribed at uniform distances or have arcs or circles marked thereupon. In these instances tools such as marking gauges and compasses are required in addition to standard tape measures.

While certain novel features of the invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY OF THE INVENTION

The apparatus of the present invention solves the problems confronted in the art in a simple and straightforward manner. What is provided in one embodiment is an adapter for tape measures which, after insertion, enables standard tape measures to be used as marking gauges and/or compasses. Another embodiment includes a tape measure apparatus with the casing being redesigned and/or adapted to include an insert enabling the tape measure to be used as a marking gauge and/or compass.

An object of the present invention is to provide a tape measure with insert which can be used in combination with a marking/cutting tool, such as a pencil or knife, to make a mark, score or cut line at a measured distance on a workpiece.

An alternative object of the present invention is to provide a tape measure with insert which can also be used in combination with a marking/cutting tool, such as a pencil or knife, to make a mark, score or cut line on a workpiece in the shape of an arc or circle at a measured radius.

An additional object of the present invention is to provide a tape measure with insert which protects the person using the tape measure and insert as a marking gauge to make a mark, score or cut line.

An additional object of the present invention is to provide a tape measure with insert which allows the user to grip the extended portion of the rule blade lying on top of the insert and thereby stabilize the tape measure and insert during use as a marking gauge.

An additional object of the present invention is to provide a tape measure and insert whereby the insert fits in the tape measure casing to minimize the overall change in dimension of the casing when the insert is not being used.

A further object of the present invention is to provide a tape measure with insert that is simple and easy to use as a marking gauge or compass.

A still further object of the present invention is to provide an insert for a standard tape measure that is economical in cost to manufacture.

A still further object of the present invention is to provide a tape measure and insert combination which can be used in combination with a marking/cutting tool, such as a pencil or knife, to make a mark, score or cut line at a measured distance on a workpiece.

Further objects of the present invention will appear as the description proceeds.

For a further understanding of the nature, objects, and advantages of the present invention, reference should be had to the following detailed description, read in conjunction with the following drawings, wherein like reference numerals denote like elements. However, the drawings are illustrative only, and changes may be made in the specific construction illustrated and described within the scope of the appended claims.

BRIEF DESCRIPTION OF THE SEVERAL VIEWS OF THE DRAWINGS

FIG. 1 is a perspective view of an embodiment of the apparatus of the present invention;

FIG. 1A is a perspective view with the insert installed in the tape measure casing;

FIG. 2 is a perspective view of an embodiment of the insert;

FIG. 3 is a side view of an embodiment of the insert;

FIG. 4 is a side view of the insert and tape measure wherein the insert is positioned inside the casing of the tape measure;

FIG. 5 is a side view of the insert and tape measure wherein the insert is extended from the casing of the tape measure;

FIG. 8 shows an insert and tape measure wherein the insert includes a slot which slidably engages a pin mounted in the tape measure's casing;

FIG. 9 shows a cutout of the insert and tape measure wherein the insert includes a slot which slidably engages a pin mounted in the tape measure's casing;

FIG. 10 shows an insert and tape measure wherein the insert includes pins which slidably engage tracks in the tape measure's casing.

FIG. 11 shows a cutout of the tape measure casing wherein the casing includes tracks which slidably engage pins of the insert;

FIG. 12 shows a perspective view of an insert with the guide having a pivoting point;

FIG. 13 shows an alternative embodiment wherein the insert base includes first and second portions of first and second widths to accommodate the rule blade locking bar for certain standard tape measures;

FIG. 14 shows an alternative embodiment wherein the insert base includes a portion of decreased width;

FIG. 15 shows another alternative embodiment wherein the insert includes a portion of decreased width;

FIG. 16 is a front view of the insert showing a sloped area at the front edge of the insert base to reduce shear forces on end hook rivets during complete retractions of rule blade;

FIG. 17 is a front view of a standard tape measure housing (insert not shown) showing the rule blade aperture, rule blade, and rule blade locking bar;

FIG. 18 is a side view of the alternative embodiment shown in FIG. 12 and showing a catch which is integrally formed with the base of the rule blade;

DETAILED DESCRIPTION

Figure 6:
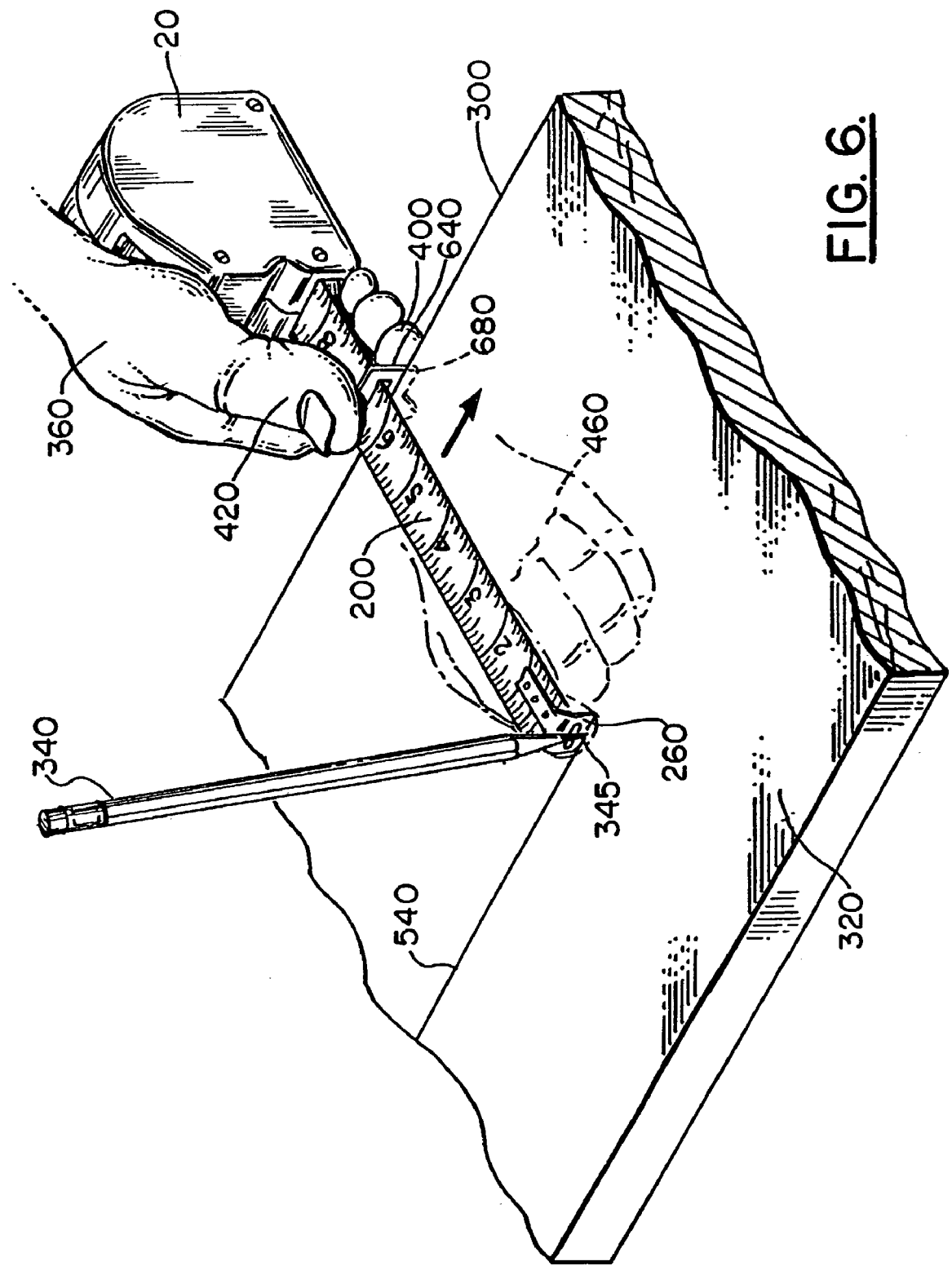
FIG. 6 shows a tape measure with insert being used in combination with a pencil to make a mark or cut line on a workpiece.
Figure 7:
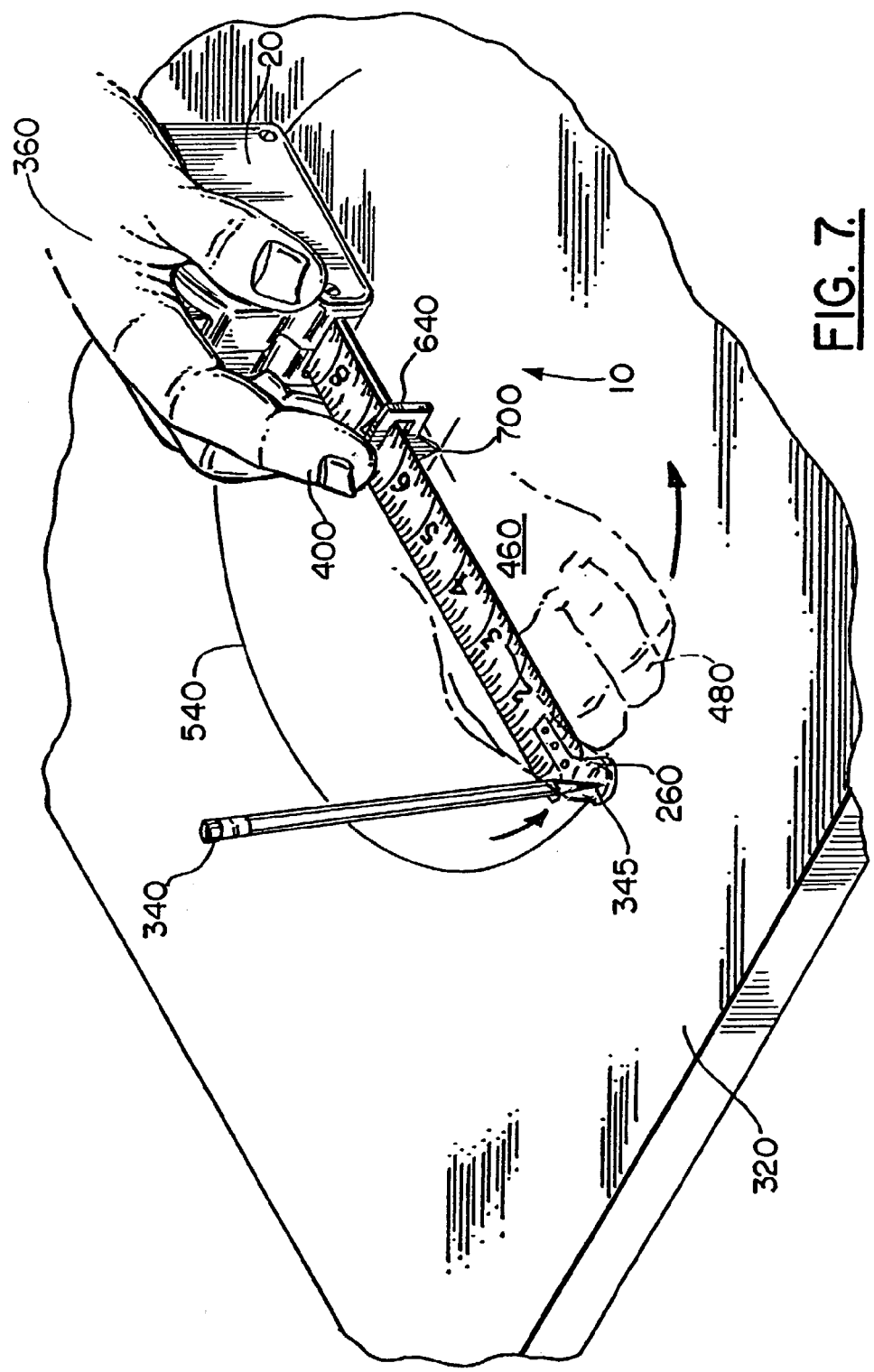
FIG. 7 shows a tape measure with insert being used in combination with a pencil to make an arc or circle on a workpiece.

FIGS. 1 through 6 show an embodiment of the apparatus of the present invention, designated generally by the numeral 10 in FIGS. 1, 1A, 4 and 5. FIGS. 1 through 5 illustrate tape measure apparatus 10 which can include a conventional type tape measure 20 comprising a casing 40 having two side walls 60, a top wall 80, a bottom wall 100, a rear wall 120 and a front wall 140 defining enclosure 160. Front wall 140 has a rule blade aperture 180 adjacent to bottom wall 100. Rule blade 200 is normally retractably stored in a coiled condition within enclosure 160 of casing 40. An inner end 205 of rule blade 200 is secured within enclosure 160, while an outer end 210 of rule blade 200 protrudes through blade aperture 180 in casing 40. Graduated indicia markings 220 along the length of the rule blade 200 function as a measuring scale.

A lock and automatic rewind switch 240 can be carried on top wall 80 or front wall 140 of casing 40, to keep a portion of rule blade 200 in an extended locked position through blade aperture 180 in casing 40. Rule blade 200 is elongated, slightly concave and fabricated out of a substantially strong and durable material. Switch 240 is manually operated to retract rule blade 200 into enclosure 160 of casing 40. End hook 260 is attached to outer end 210 of rule blade 200. End hook 260 is adapted to be normally laid over an edge 300 of a workpiece 320 to be measured, such as an item of wood, sheetrock, or other material.

An insert 560 has an arcuate base 580 connected to guide 680. The base 580 is constructed so as to follow the slightly concaved arc formed by outer end 210 of rule blade 200 after protruding through aperture 180. Base 580 can be attached to guide 680 as a single unit or pivotally connected. Extending from base 580 is indicator 620 from which the graduated indicia markings 220 of rule blade 200 are read to determine the distance from guide 680 to end hook 260 of rule blade 200. Using such reading a mark, score or cut line 540 of a precise distance can be made. Indicator arm 640 may extend across guide 680 to provide an easier method of reading distance 720. Guide 680 may include point 700.

Catch 600 is attached to the end of base 580 opposing guide 680. Catch 600 should be constructed of a substantially strong and durable material. Attachment may be by means of screws, rivets, welding, adhesive, or a tongue and groove connection. Catch 600 may also be attached to base 580 through a slot where the top connecting end of catch 600 may be a "T" fitting in said slot (or any connecting means that would allow catch 600 to swivel in relation to base 580) and the bottom of catch 600 opposing complete removal of the insert as the insert is extended from casing 40. Alternatively, catch 600 may be constructed as a single unit with insert base 580.

In an alternative embodiment, slot 602 and pin 603 may be used for the insert and casing. (See FIGS. 8 and 9). In this embodiment, slot 602 slidably engages pin 603 and insert 560 may be extended outside of casing 40 until rear of slot 604 engages pin 603. Pin 603 may be cast as a single piece with one side of casing 40 or as two pieces from both sides of casing 40. Notch 616 may be used to facilitate initial installation of pin 603 in slot 602. Alternatively, pin 603 may be separate from casing 40 and attached through conventional fasteners, such as a screw, rivet, other fastening means, or adhesive. This embodiment may be included as an option by a manufacturer of the improved tape measure apparatus with insert.

In a further alternative embodiment, a pair of pins 612 and pair of tracks 613 may be used. (See FIGS. 10 and 11). Pins 612 slidably engage tracks 613 and insert 560 may be extended outside of casing 40 until pins 612 engage front of tracks 614. Pins 612 can be extended for added stability. Alternatively, tracks 613 may be constructed so that edges of insert base 615 slidably engage tracks 614 without the use of pins 612. These embodiments may be included as an option by a manufacturer of the improved tape measure apparatus with insert.

Point 700 may be constructed as a single unit with or pivotally attached to insert base 580 or guide 680. In one embodiment point 700 is pivotally attached to guide 680 or base 580. Pivotally attaching point 700 provides the advantage of removing or hiding point 700 when the insert and tape measure is not being used as a compass. Point 700 can also be slidably connected to guide 680 or base 580 and provide the same advantage. Alternatively, point 700 may also be constructed as a single unit with or pivotally attached to the bottom wall 100 of casing 40.

Point 700, guide 680, indicator 620, indicator arm 640, and insert base 580 may be constructed as a single piece. If constructed as a single piece, slot 660 would be included between indicator arm 640 and guide 680 to allow rule blade 200 to be inserted under indicator arm 640. Another embodiment includes indicator 620 and indicator arm 640 being removably attached to guide 680 by means of standard connectors such as screws, snaps, hinges, or pivots. Other types of attaching assemblages can be utilized, such as rivets, springs or tongues and grooves, not shown in the drawings.

In some standard tape measures, such as those manufactured by Lufkin, a rule blade locking bar 242 is used to lock down the rule blade 200 by wedging rule blade 200 under locking tabs 243. FIG. 17 shows a front view of a standard tape measure casing 40 (insert 560 is not shown) including rule blade aperture 180, rule blade 200, and rule blade locking bar 242. In some circumstances the thickness of insert base 580, after being placed between rule blade 200 and base 182 of aperture 180, can hinder full lock down by locking bar 242. To avoid this, part of the insert base width can be removed, as shown in FIGS. 13 through 15, to make the width less than the distance between locking tabs 243. The extent of material to be removed depends on the distance between the locking tabs 243. FIG. 13 shows an alternative embodiment wherein the insert base 580 includes two portions of reduced widths 617 and 618. This embodiment can accommodate at least two different distances between locking tabs 243. FIG. 14 shows an alternative embodiment wherein the insert base 580 includes a portion of reduced width 618, accommodating smaller distances between locking tabs 243. FIG. 15 shows an alternative embodiment wherein the insert base 580 includes a portion of reduced width 617, accommodating larger distances between locking tabs 243.

FIG. 16 is a front view of insert 560 showing a sloped area 682 at the front edge of the insert base 580 and guide 680 reducing, during complete retraction, shear forces on rivets 262 (shown in FIG. 19) which attach end hook 260 to rule blade 200. Sloping area 682 reduces the shear forces on rivets 262 when the rule blade 200 is completely retracted inside the casing 40 by gradually raising the rivets during complete retraction. Pivoting point 684 may also be included to a portion of guide 680 to pivot.

Insert 560 can be installed in a standard tape measure 20. The insert 560 is first placed under rule blade 200 with catch 600 closest to the front wall 140 of casing 40 (see FIG. 1A). Insert 560 and catch 600 is then inserted under rule blade 200 through aperture 180 in casing 40. Aperture 180 may have to be manually widened to allow both insert base 580 and rule blade 200 to slide there through. This may be done by a knife or other cutting tool.

Alternatively, one of the side walls 60 of casing 40 can be opened by removal of casing screws 45. (FIGS. 1, 4, and 5). However, care must be taken not damage the wound up portion of rule blade 200. Once side wall 60 is removed insert 560 can be slid into aperture 180 and under rule blade 200. After so positioning insert 560, side wall 60 is again attached to casing 20 by means of casing screws 45.

In one embodiment catch 600 and/or insert base 580 is constructed of a flexible material and during insertion bending will occur allowing insert base 580 and catch 600 to enter casing enclosure 160. After entering casing enclosure 160, catch 600 will act to resist insert base 580 from being completely pulled out of casing enclosure 160. Insert base 580 will slide into casing enclosure 160 until guide 680 is stopped by front wall of casing 140. The length of insert base 580 can be such that when guide 680 is stopped by front wall 140 of casing, insert 560 is close, if not touching, the enclosure's rear wall 170. (see FIG. 4).

After installation, insert base 580 will slide out of casing 20 until catch 600 resists further movement by abutting front wall 165 of enclosure 160. Pulling out insert 560 converts tape measure 20 into a marking gauge and/or compass.

Insert 560 can be removed from tape measure 20 by opening one of the side walls 60 of casing 40 by removal of screws 45. Because catch 600 is constructed of a flexible material, insert 560 may also be removed by pulling guide 680 until it is stopped by catch 600. At such point, guide 680 should be pushed down thereby causing catch 600 to raise relative to front wall of enclosure. At this point, catch 600 can be pulled through casing aperture 180 thereby removing insert 560. Insert 560 can thereby be reinstalled or installed in another tape measure.

FIG. 18 is a side view of the alternative embodiment shown in FIG. 13 and showing catch 680 manufactured as single piece with base 580. This design facilitates easy removal of insert 560 after it has been installed. Insert 560 can be tugged out of aperture 180 and catch 680 will slide over bottom 182 of aperture 180. The integrally formed catch 680 can be used in any of the embodiments.

While insert 560 and tape measure 20 operate as a marking gauge, guide 680 produces a smooth gliding motion when being moved along edge 300 of workpiece 320, while keeping index finger 400 of second hand 360 away from edge 300. This makes the tape measure and insert steady and eliminates abrasion of index finger 400 preventing index finger 400 from touching edge 300. A marking/cutting tool 340 can be grasped by fingers 480 of second hand 460 of a person, to make a mark, a score or cut line 540 across workpiece 320. The guide 620 of insert 560 protects index finger 400 of first hand 360 of the person holding tape measure 20 while being moved along an edge 300 of workpiece 320 and making the mark, score or cut line 540 across the workpiece 320 with marking/cutting tool 340.

OPERATION

Marking Gauge

To use insert 560 the tape measure 20, as a marking gauge, the following steps should be taken:

1. Manually release lock and automatic rewind switch 240, to unlock rule blade 200, if the tape measure 20 is provided with a lock and automatic rewind switch 240;

2. Pull guide 680 until it is stopped by catch 600;

3. Grasp insert base 580 and rule blade 200 with thumb 420 and index finger 400 of first hand 360;

4. Butt the guide 680 against edge 300 of workpiece 320.

5. Extend rule blade 200 to the desired length;

6. Place the marking/cutting tool 340 against end hook 260;

7. Hold the marking/cutting tool 340 with the fingers 480 of second hand 460;

8. Move the guide 680 along edge 300 of workpiece 320, so that marking/cutting tool 340 will make a mark, score or cut line 540 across workpiece 320.

Grasping insert base 580 and rule blade 200 enables the user to gain stability while ensuring that rule blade 200 does not move when making mark 540.

Compass

To use insert 560 and tape measure 20 as a compass, the following steps should be taken:

1. Manually release lock and automatic rewind switch 240 to unlock rule blade 200 if tape measure 20 is provided with a lock and automatic rewind switch 240;

2. Pull guide 680 until it is stopped by catch 600;

3. Place point 700 on workpiece 320;

4. Grasp tape measure 20 with first hand 360 placing index finger 400 on top of indicator arm 640;

5. Extend rule blade 200 to the desired length and reset switch 240 to lock;

6. Place the marking/cutting tool 340 against and hook 260;

7. Hold the marking/cutting tool 340 with the fingers 480 of second hand 460 and steady rule blade 200 by placing index finger 400 behind indicator arm 640 and on top of rule blade 200;

8. Rotate tape measure 20 around point 700, so that marking/cutting tool 340 will make an accurate mark, score or cut line 540 on workpiece 320.

Placing index finger 400 on top of rule blade 200, and applying pressure not only stabilizes the apparatus while making the arc or circle, but also ensures the accuracy of the measurement by preventing rule blade 200 from making any movement while making the arc or circle.

Figure 19:
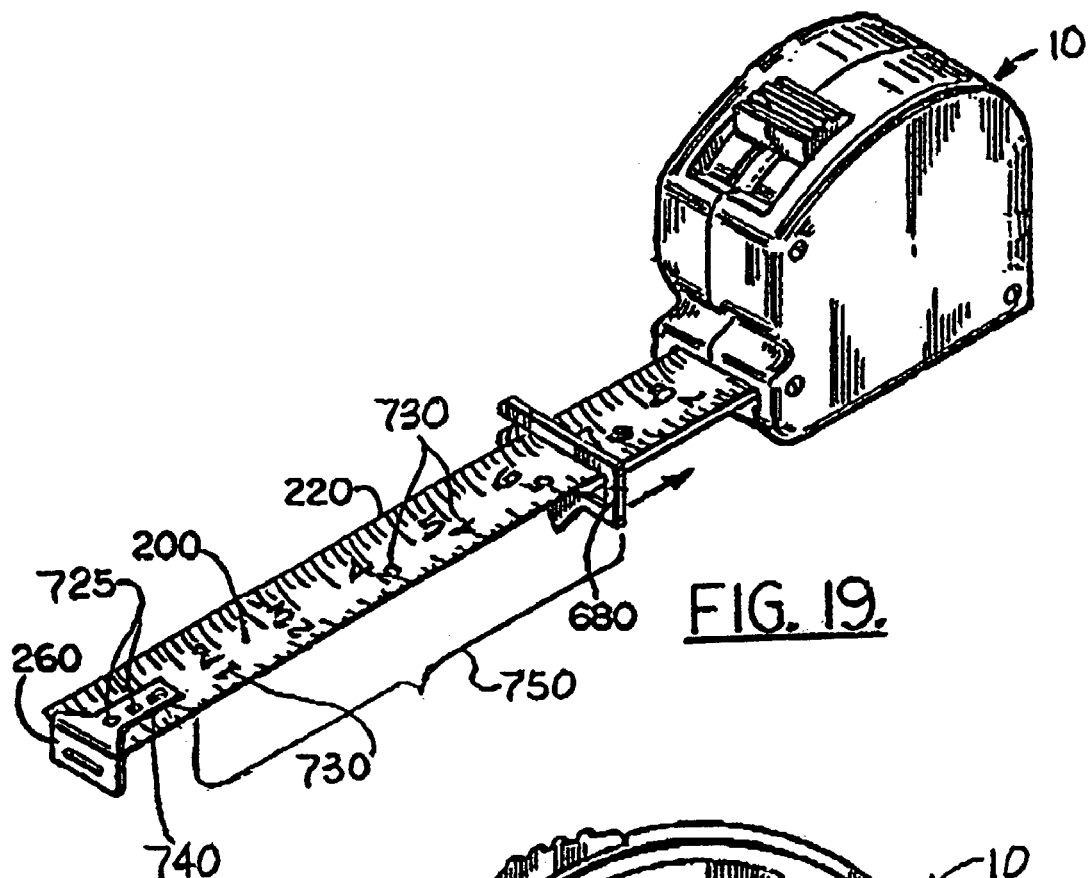
FIG. 19 shows an alternative embodiment where a hole and second set of numbers are used to make a mark, score or cut line.

An alternative embodiment is shown in FIG. 19 where a hole 740 and second set of numbers 730 are used to make a mark, score or cut line. Marking cutting tool 340 is placed in hole 740 (instead of in front of the end hook 260) to make a mark, score or cut line 540 on a workpiece at a distance 750 from marking guide 680. Hole 740 helps to stabilize marking/cutting tool 340 as a mark, score or cut line 540 is made on a workpiece. Hole 740 can be separately made in rule blade 200 at a convenient distance from end hook 260 or can be an open rivet fastening end hook 260 to rule blade 200.

Figure 20:
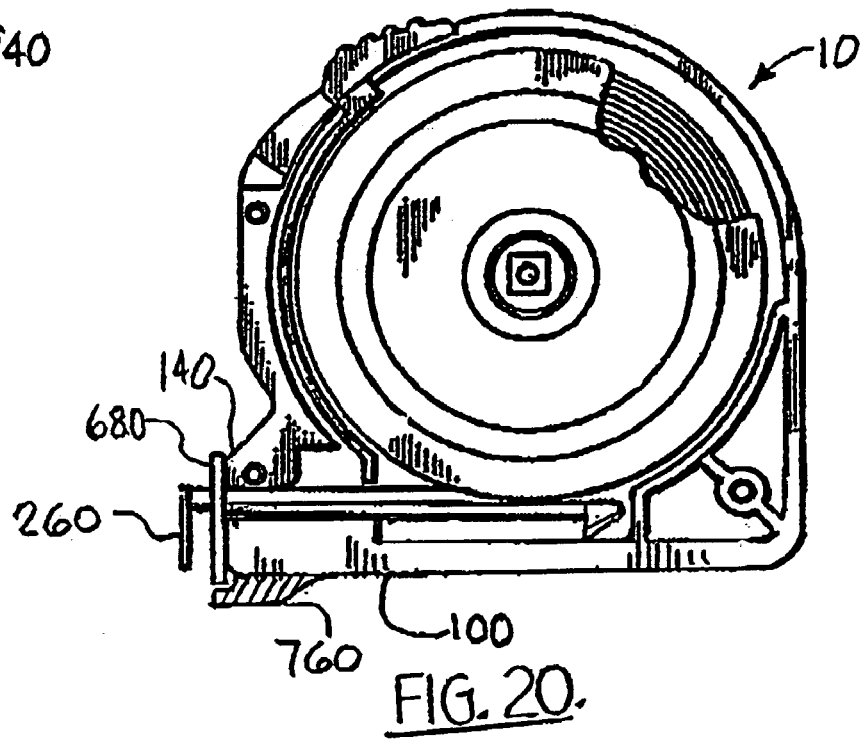
FIG. 20 shows an alternative embodiment where bumper 760 can be constructed to conform to all or a portion of the shape of guide.

In another alternative embodiment shown in FIG. 20, bumper 760 can be constructed to conform to all or a portion of the shape of guide 680. In this embodiment all or a portion of guide 680 can be flush with front wall 140 and/or bottom wall 100. Bumper 760 can be integrally molded with tape measure casing 40 or can be separate from tape measure casing 40. Bumper 760 can prevent guide 680 from inadvertently catching on a workpiece and extending from tape measure 10 when the apparatus is not being used as a marking device.

Figure 21:
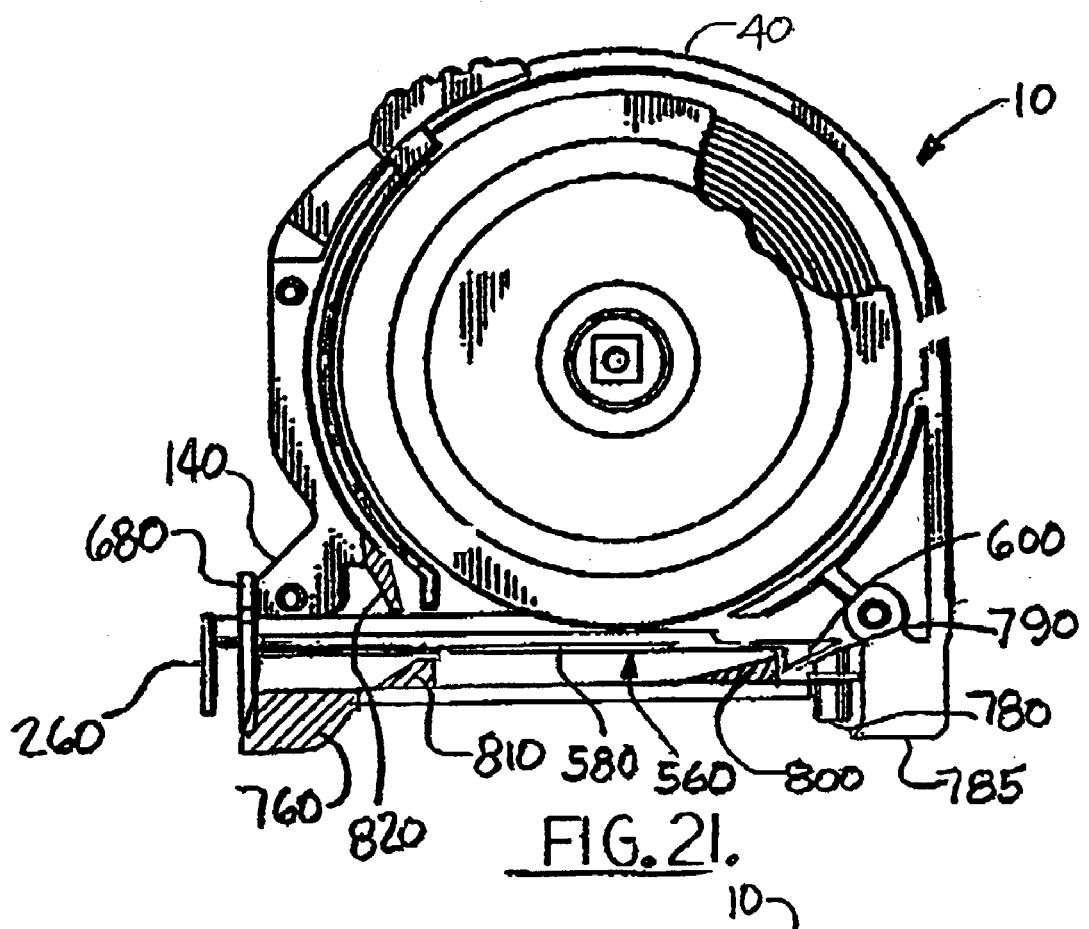
FIG. 21 shows an alternative embodiment where a quick release mechanism is provided to release the insert from the tape measure housing.
Figure 22:
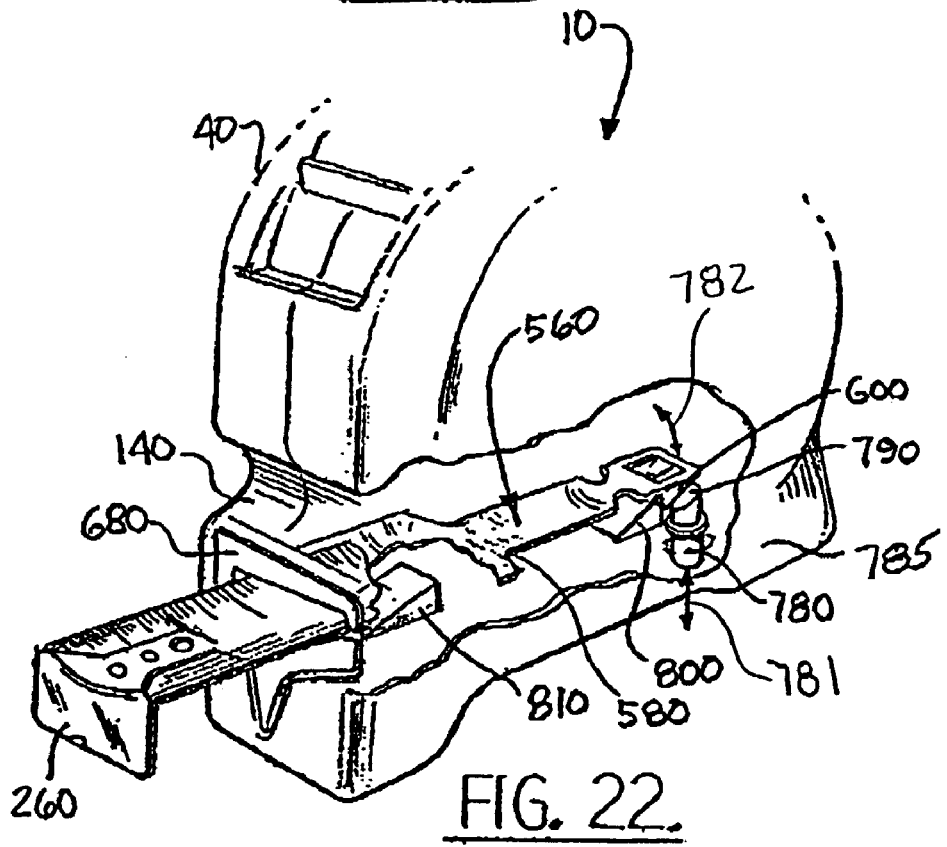
FIG. 22 is a perspective view of the embodiment shown in FIG. 20.

In another alternative embodiment shown in FIGS. 21 and 22, a quick release mechanism is provided to release the insert 560 from the tape measure apparatus 10. The quick release mechanism can include a button 780, innermost stop 800, and catch for insert 600. When inserted into casing 40, catch 600 interlocks with innermost stop 800. Such interlocking can prevent insert 560 from extending from casing 40 when end hook 260 rule blade is pulled out of casing 40. To release insert 560, button 780 is pushed in the direction of arrow 781 causing tip of button 790 to push catch 600 upward in the direction of arrow 782 over innermost stop 800. Catch 600 and tip of button 790 can be angled so that catch 600 is also pushed forward. After release insert 560 can be extended from casing 40 until stopped by front wall of enclosure 165. Guard 785 can be provided forming a ring around button 780 and resisting unintended release and snagging of button.

In another alternative embodiment second stop 810 and wipe 820 are provided to resist further outward movement of insert 560. Wipe 820 resists upward movement of insert base 580 facilitating interlocking between catch 60 and second stop 810.

Figure 23:
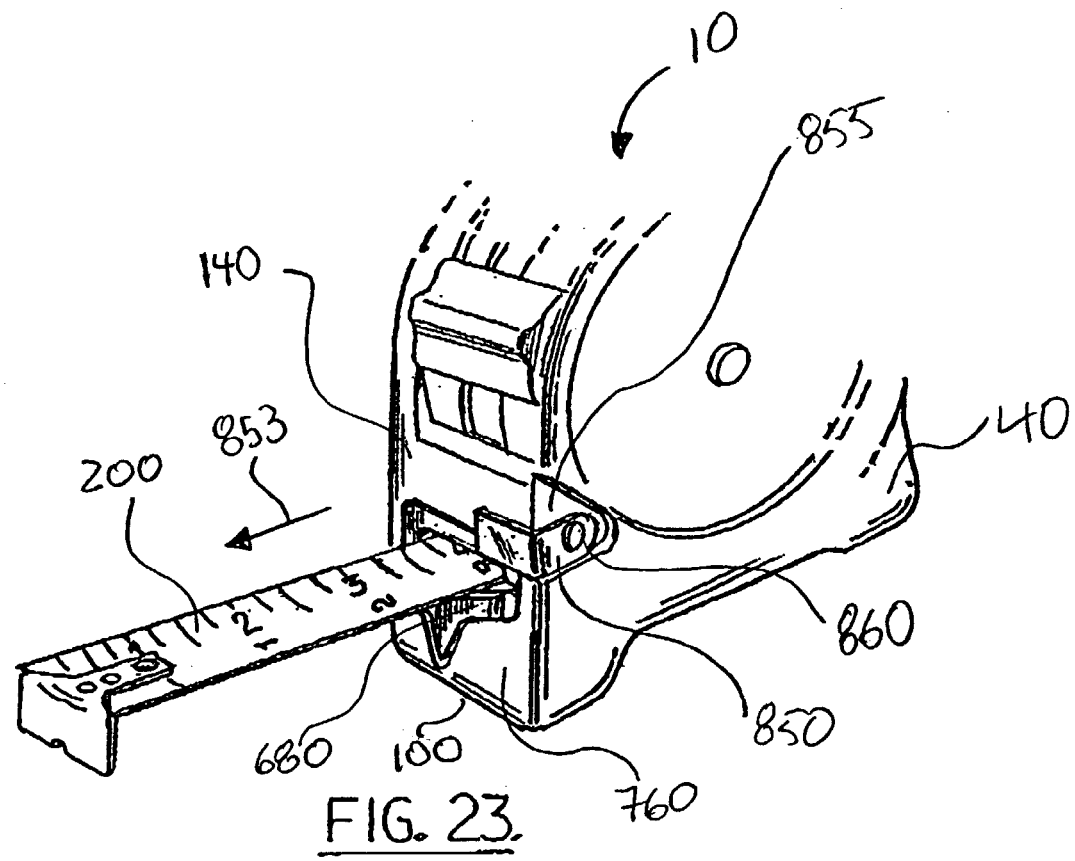
FIG. 23 shows another alternative embodiment wherein a clip is used to keep the insert retracted in the housing when the insert is not being used.
Figure 24:
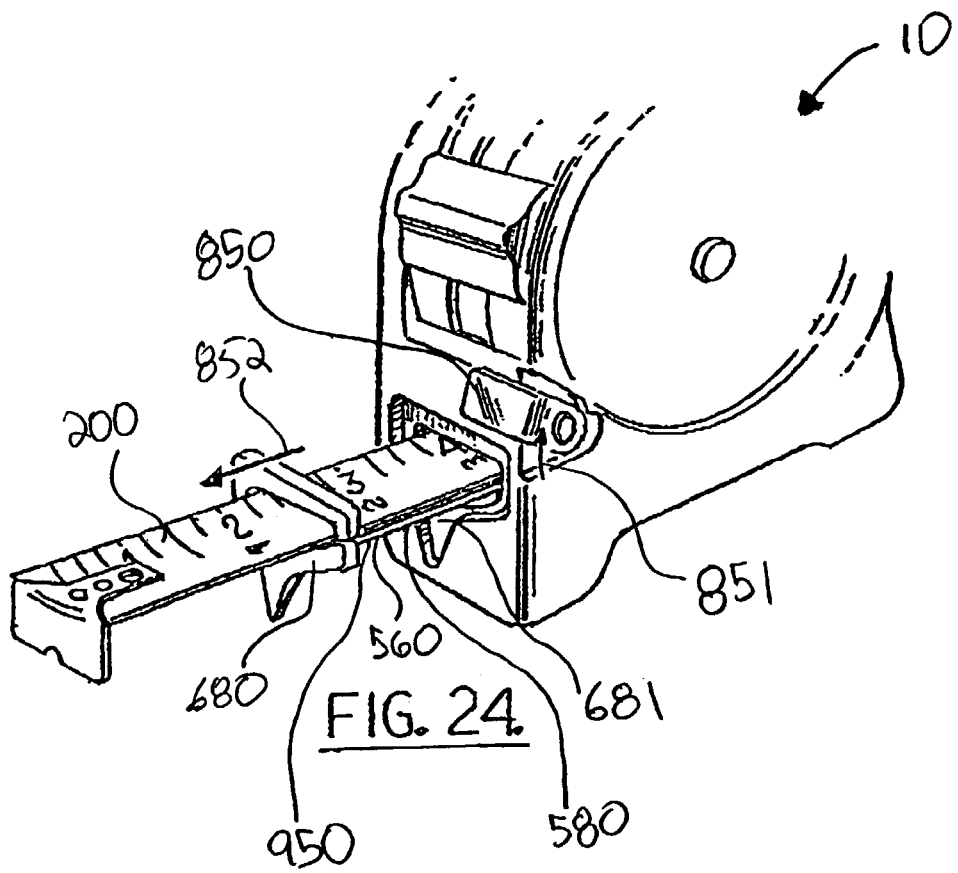
FIG. 24 is a perspective view of the embodiment shown in FIG. 22.

In another alternative embodiment shown in FIGS. 23 and 24, a locking clip 850 is provided to keep insert 560 retracted in casing 40, when insert 560 is not in use. When insert 560 is not in use, clip 850 keeps insert in casing 40 when rule blade 200 is pulled in the direction of arrow 853. If not locked, clip 850 can be inadvertently pulled out of the recessed position when rule blade 200 is pulled in the direction of arrow 853. Clip 850 is shown pivotally connected to casing 40 at point 860. Recess 855 in casing 40 can restrict the range of motion of clip 850 and can also prevent clip 850 from inadvertently catching on a workpiece or other item and can increase the overall aesthetic appeal of tape measure 10.

Clip 850 can be attached using any conventional means including, but not limited to pivotally connected, a slide, snap, or magnetic connecting means. Additionally, clip 850 can be a bar extending completely across front wall 140 and be pivotally connected on both side walls 60 as shown in FIG. 24A using clip 850'. The bar configuration would accommodate both left and right handed persons. If a slide is chosen, clip 850 can slide from top to bottom or from side to side (or diagonally). Clip 850 can also be constructed of a shape, including but not limited to button, rib, or cone, to ease movement between locking and unlocking positions. Additionally. magnet 900 can be used to magnetically encage insert 560.

To release insert 560, clip 850 is pushed up in the direction of arrow 851. Rule blade 200 is pulled in the direction of arrow 852, which because of friction will tend to also pull insert 560 in the direction of arrow 852. Furthermore, a button 870 or other quick release mechanism (not shown) can be provided to lock and/or release clip 850.

Figure 25:
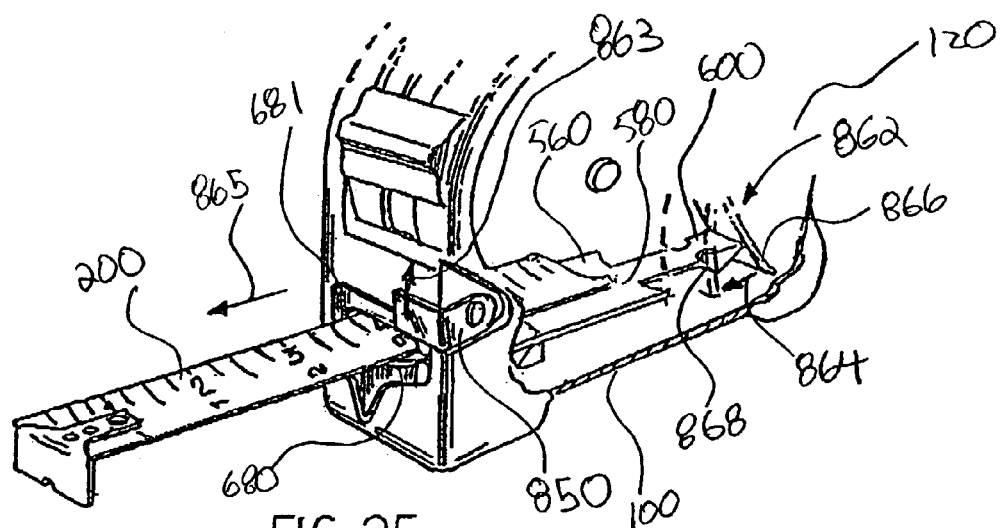
FIGS. 25, 26, and 26A show another alternate embodiment including a spring or flexible member.
Figure 26:
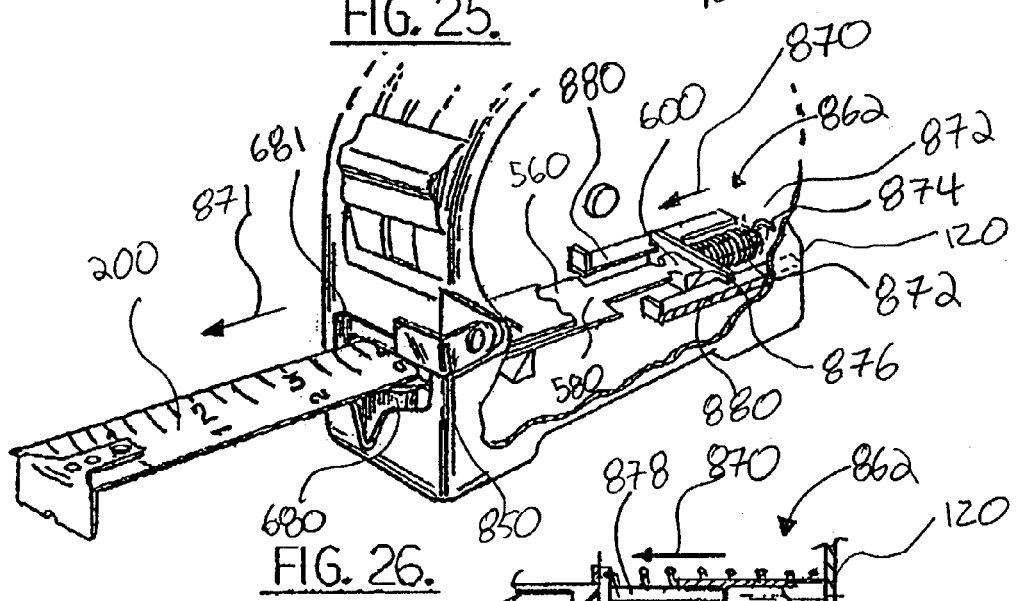
Figure 26A:
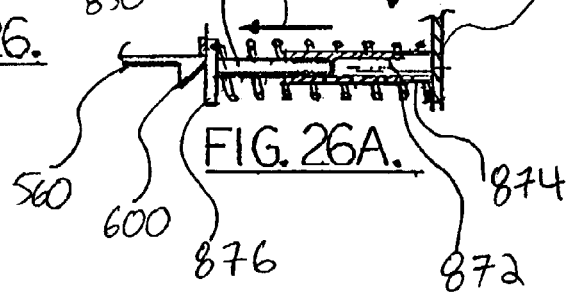

In an alternative embodiment shown in FIGS. 25, 26, and 26A, clip 850 can be combined with a spring or flexible member 862. Spring or flexible member 862 operatively engages insert 560 such that member 862 tends to push insert 560 out of the retracted position in the direction of arrows 865, 871. Spring or flexible member 862 can be connected to rear wall 120 as shown in FIG. 25 or bottom wall 100 of casing 40. Spring or flexible member 862 is helpful where in insert 560 is in a retracted position and guide 680 is held fully recessed in recess 681. Spring or flexible member 862 can operatively engage insert 560 by tending to cause the insert to move from the retracted position towards the extended position in the direction of arrows 865,871. Spring or flexible member 862 can engage base 580 and/or catch 600. When clip 850 is moved to the unlocked position in the direction of arrow 863, spring or flexible member 862 tends to push insert 560 in the direction of arrows 865,871 and out of the retracted position. Otherwise, it may be difficult for a user to grab guide 680 to extend insert 560 from the retracted position, especially where guide 680 is fully recessed in recess 681. Clip 850, while over guide 680 can maintain insert 560 in the retracted position.

In the embodiment shown in FIG. 25, spring or flexible member 862 is comprised of a single flexible member connected to rear wall 120. To cause insert 560 to extend to a retracted position, member 862 operatively engages catch 600 by pushing from first position 866 to second position 868 in the direction of arrow 864. Member 862 can also be connected to bottom wall 100 and have a similar method of causing insert 560 to extend to an extended position.

In FIGS. 26 and 26A, spring or flexible member 862 is comprised of spring element 872, stud 874, notched plate 876, stem 878, and tracks 880. To cause insert 560 to extend to a retracted position, notched plate 876 operatively engages catch 600 by pushing in the direction of arrow 870. Stem 878 can slidably engage stud 874 and spring 872 can be installed over both stem 878 and stud 874.

Spring or flexible member 862 can be combined with the embodiment disclosed in FIGS. 21 and 22. In this combination locking clip 850 is not required, but can be used.

Casing 40 can include bumper 760 which can be constructed to conform to all or a portion of the shape of guide 680. In this embodiment all or a portion of guide 680 can be flush with front wall 140 and/or bottom wall 100. Recess 681 is shown for allowing guide 680 to be flush with front wall 140. Bumper 760 can be integrally molded with tape measure casing 40 or can be separate from tape measure casing. Bumper 760 can prevent guide 680 from inadvertently catching on a workpiece or other item and can increase the overall aesthetic appeal of tape measure 10.

In an alternative embodiment a gripping surface 950 can be provided on base 580 of insert 560. This gripping surface can increase the frictional coefficient between base 580 and rule blade 200 to resist slippage of rule blade 200 during use. Gripping surface 950 can cover the entire base 580 or a portion thereof, such as the area around catch 600 and/or the longitudinal middle of base 580. The gripping surface 950 can be any material of sufficient frictional coefficient, including but not limited to rubber and plastic.

Insert 560 can also be coated, painted and/or plated to increase its aesthetic appeal and/or wear resistance. Furthermore, for strength considerations, guide 680 can be fabricated out of a different material than base 580, such as steel, metal, or other material of suitable strength.

It will be understood that each of the elements described above, or two or more together may also find a useful application in other types of methods differing from the type described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims:

The following is a list of parts and materials suitable for use in the present invention:

PARTS LIST

| Part No. | Description |
|---|---|
| 10 | tape measure apparatus |
| 20 | tape measure |
| 40 | casing |
| 45 | casing screws |
| 60 | side wall of casing |
| 80 | top wall of casing |
| 100 | bottom wall of casing |
| 120 | rear wall of casing |
| 140 | front wall of casing |
| 160 | enclosure in casing |
| 165 | front wall of enclosure |
| 170 | rear wall of enclosure |
| 180 | aperture in casing for rule blade |
| 182 | base of aperture in casing |
| 200 | rule blade of tape measure |
| 205 | inner end of rule blade |
| 210 | outer end of rule blade |
| 220 | graduated indicia markings on rule blade |
| 240 | lock and automatic rewind switch of tape measure |
| 242 | rule blade locking bar |
| 243 | locking tabs |
| 260 | end hook of rule blade |
| 262 | rivets for end hook |
| 280 | work piece |
| 300 | edge of workpiece |
| 320 | top of workpiece |
| 340 | marking/cutting tool (pencil or knife) |
| 345 | tip of marking/cutting tool |
| 360 | first hand |
| 380 | finger of first hand |
| 400 | index finger of first hand |
| 420 | thumb of first hand |
| 460 | second hand |
| 480 | fingers of second hand |
| 540 | mark, score or cut line on workpiece |
| 560 | insert |
| 580 | insert base |
| 600 | catch for insert |
| 602 | slot for insert |
| 603 | pin in casing |
| 604 | rear end of slot for insert |
| 612 | pins for insert |
| 613 | tracks in casing |
| 614 | front end of tracks |
| 615 | edges of insert base |
| 616 | notch for slot |
| 617 | portion of reduced width |
| 618 | portion of reduced width |
| 620 | indicator for insert |
| 640 | indicator arm |
| 660 | slot |
| 680 | guide for insert |
| 681 | recess |
| 682 | sloped portion |
| 684 | pivot point for guide |
| 700 | point for insert |
| 710 | pivot for insert |
| 720 | distance from indicator to end hook |
| 725 | rivets |
| 730 | second set of numbers |
| 740 | open rivet |
| 750 | distance |
| 760 | bumper |
| 780 | button |
| 781 | arrow |
| 782 | arrow |
| 785 | guard |
| 790 | tip of button |
| 800 | innermost stop |
| 810 | second stop |
| 820 | wipe |
| 850 | clip |
| 851 | arrow |
| 852 | arrow |
| 855 | recess |

-continued

PARTS LIST

| Part No. | Description |
| --- | --- |
| 860 | point |
| 862 | spring or flexible member |
| 863 | arrow |
| 864 | arrow |
| 865 | arrow |
| 866 | first position |
| 868 | second position |
| 870 | arrow |
| 871 | arrow |
| 872 | spring |
| 874 | stud |
| 876 | plate |
| 878 | stem |
| 880 | tracks |
| 950 | gripping surface |

All materials used or intended to be used in a human being are biocompatible, unless indicated otherwise. The insert 560 and other items may be constructed of metal, plastic, injection molded plastic, wood, or any other material which is substantially strong and durable.

The foregoing embodiments are presented by way of example only; the scope of the present invention is to be limited only by the following claims.

What is claimed is:

1. A tape measure apparatus comprising:
   a) a casing having two side walls, a bottom wall, a rear wall, and a front wall defining an enclosure, the front wall having a blade aperture adjacent the bottom wall;
   b) a rule blade having inner and outer end portions and being retractably stored in a coiled condition within said enclosure of the casing, the inner end of the rule blade secured within the enclosure, the outer end of the rule blade protruding through the blade aperture when extended during use;
   c) graduated indicia markings along the length of said rule blade, functioning as a measuring scale;
   d) an end hook attached to the outer end of the rule blade;
   e) an insert slidably connected to the casing through the blade aperture and movable between retracted and extended positions; and
   f) the insert comprising:
      i) a base;
      ii) a guide, the guide being non-pivotally attached as a single unit to the base and generally parallel to the graduated markings of the rule blade.

2. The tape measure apparatus as recited in claim 1, wherein the guide comprises front and rear faces, the front face having a substantially flat surface.

3. The tape measure apparatus as recited in claim 1, further comprising a catch attached to the insert base, the catch being configured to resist efforts to pull the insert completely out of the casing enclosure.

4. The tape measure apparatus as recited in claim 2, further comprising an indicator connected to the guide that enables the graduated markings of the rule blade to be easily read.

5. The tape measure apparatus as recited in claim 4, further comprising an indicator arm attached to the indicator and extending along the length of the guide, generally parallel to the graduated markings of the rule blade.

6. The tape measure apparatus as recited in claim 2, further comprising a catch attached to the insert base, the catch being configured to resist efforts to pull the insert completely out of the casing enclosure.

7. The tape measure apparatus as recited in claim 6, further comprising an indicator connected to the guide that enables the graduated markings of the rule blade to be easily read.

8. The tape measure apparatus as recited in claim 7, further comprising an indicator arm attached to the indicator and extending along the length of the guide, generally parallel to the graduated markings of the rule blade.

9. The tape measure apparatus as recited in claim 2, further comprising a point connected to the bottom center of the guide and pointing downward and allowing the insert to be rotated around the point.

10. The tape measure apparatus as recited in claim 3, further comprising a point connected to the bottom center of the guide and pointing downward and allowing the insert to be rotated around the point.

11. The tape measure apparatus as recited in claim 3, wherein the base, guide, and catch are fabricated out of a single substantially strong and durable material.

12. The tape measure apparatus as recited in claim 6, wherein the base, guide, and catch are fabricated out of a single substantially strong and durable material.

13. The tape measure apparatus as recited in claim 2, further comprising a first portion of the insert base with a first reduced width.

14. The tape measure apparatus as recited in claim 13, further comprising a second portion of the insert base with a second reduced width.

15. The tape measure apparatus as recited in claim 1, further comprising a sloped portion of the guide for reducing sheer forces to end hook during retraction of rule blade into the enclosure.

16. The tape measure apparatus as recited in claim 6, wherein the catch and base are fabricated out of a single substantially strong and durable material.

17. The tape measure apparatus as recited in claim 1, wherein the rule blade includes top and bottom faces, the rule blade further comprising a first and a second set of numbers along at least a portion of the length of the top face of the rule blade, the second set of numbers being offset a set distance from the first set of numbers and being of the same measuring scale as the first set of numbers.

18. The tape measure apparatus as recited in claim 17, wherein the second set of numbers are offset a distance in one inch intervals.

19. The tape measure apparatus as recited in claim 17, further comprising a hole in the rule blade accepting a marking or scoring instrument.

20. The tape measure apparatus as recited in claim 19, wherein the hole is an open rivet and connects the end hook to the rule blade.

21. The tape measure apparatus as recited in claim 1, the casing further comprising a bumper receiving at least a portion of the guide.

22. A tape measure apparatus comprising:
   a) a casing having two side walls, a bottom wall, a rear wall, and a front wall defining an enclosure, the front wall having a blade aperture adjacent the bottom wall;
   b) a rule blade having inner and outer end portions and being retractably stored in a coiled condition within said enclosure of the casing, the inner end of the rule blade secured within the enclosure, the outer end of the rule blade protruding through the blade aperture when extended during use;

c) graduated indicia markings along the length of said rule blade, functioning as a measuring scale;
d) an end hook attached to the outer end of the rule blade;
e) an insert slidably connected to the casing through the blade aperture and movable between retracted and extended positions; and
f) the insert comprising:
  i) a base;
  ii) a guide, the guide being generally parallel to the graduated markings of the rule blade, the guide having first and second sides, the distance between the first and second sides being less than or equal to about the distance between the two side walls,
  iii) the base and guide being fabricated out of a single substantially strong and durable material and
  iv) the insert being configured to resist efforts to pull the insert completely out of the casing enclosure.

23. The tape measure apparatus as recited in claim 22, wherein the guide comprises front and rear faces, the front face having a substantially flat surface.

24. The tape measure apparatus as recited in claim 22, further comprising a catch attached to the insert base, the catch being configured to resist efforts to pull the insert completely out of the casing enclosure.

25. The tape measure apparatus as recited in claim 23, further comprising a point connected to the bottom center of the guide and pointing downward and allowing the insert to be rotated around the point.

26. The tape measure apparatus as recited in claim 24, wherein the base, guide, and catch are fabricated out of a single substantially strong and durable material.

27. The tape measure apparatus as recited in claim 22, wherein the rule blade includes top and bottom faces, the rule blade further comprising a first and second set of numbers along at least a portion of the length of the top face of the rule blade, the second set of numbers being offset a set distance from the first set of numbers and being of the same measuring scale as the first set of numbers.

28. The tape measure apparatus as recited in claim 27, wherein the second set of numbers are offset a distance in one inch intervals.

29. The tape measure apparatus as recited in claim 27, further comprising a hole in the rule blade accepting a marking or scoring instrument.

30. The tape measure apparatus as recited in claim 29, wherein the hole is an open rivet and connects the end hook to the rule blade.

31. The tape measure apparatus as recited in claim 22, further comprising a bumper receiving at least a portion of the guide.

32. A tape measure apparatus comprising:
a) a casing having two side walls, a bottom wall, a rear wall, and a front wall defining an enclosure, the front wall having a blade aperture adjacent the bottom wall;
b) a rule blade having inner and outer end portions and being retractably stored in a coiled condition within said enclosure of the casing, the inner end of the rule blade secured within the enclosure, the outer end of the rule blade protruding through the blade aperture when extended during use;
c) graduated indicia markings along the length of said rule blade, functioning as a measuring scale;
d) an end hook attached to the outer end of the rule blade;
e) an insert slidably connected to the casing through the blade aperture and movable between retracted and extended positions; and
f) the insert comprising:
  i) a base;
  ii) a guide attached to the base and generally parallel to the graduated markings of the rule blade; and
  iii) a quick release mechanism operatively connected to the insert, the quick release mechanism releasing the insert from the retracted position.

33. The tape measure apparatus as recited in claim 32, wherein activation of the quick release mechanism tends to cause the insert to move from the retracted position toward the extended position.

34. The tape measure apparatus as recited in claim 32, wherein the quick release mechanism comprises a button attached to the bottom wall.

35. The tape measure apparatus as recited in claim 34, further comprising a catch attached to the insert base, the catch being configured to resist efforts to pull the insert completely out of the casing enclosure, the catch having an inclined surface, the button comprising an inclined tip which engages the inclined surface of the catch.

36. The tape measure apparatus as recited in claim 35, further comprising an innermost stop which engages the catch to maintain the insert in the retracted position.

37. The tape measure apparatus as recited in claim 35, further comprising a second stop attached to bottom wall and a distance before the front wall, the second stop engages the catch to resist efforts to pull the insert completely out of the casing enclosure.

38. The tape measure apparatus as recited in claim 37, further comprising a wiper attached to the casing, wherein during movement of the insert between the retracted and extended positions, the wiper resisting movement of base away from the bottom wall.

39. The tape measure apparatus as recited in claim 32, further comprising a bumper receiving at least a portion of the guide.

40. The tape measure apparatus as recited in claim 34, further comprising a guard at least partially encasing the button.

41. A tape measure apparatus comprising:
a) a casing having two side walls, a bottom wall, a rear wall, and a front wall defining an enclosure, the front wall having a blade aperture adjacent the bottom wall;
b) a rule blade having inner and outer end portions and being retractably stored in a coiled condition within said enclosure of the casing, the inner end of the rule blade secured within the enclosure, the outer end of the rule blade protruding through the blade aperture when extended during use;
c) graduated indicia markings along the length of said rule blade, functioning as a measuring scale;
d) an end hook attached to the outer end of the rule blade;
e) an insert slidably connected to the casing through the blade aperture and movable between retracted and extended positions; and
f) the insert comprising:
  i) a base;
  ii) a guide attached to the based and generally parallel to the graduated markings of the rule blade; and
  iii) a lock operatively connected to the insert, having locked and unlocked settings, the lock keeping the insert in a retracted position when in the locked setting.

42. The tape measure apparatus as recited in claim 41, wherein the lock comprises a clip pivotally connected to the casing.

43. The tape measure apparatus as recited in claim 42, wherein the clip engages the guide to keep the insert in a retracted position.

44. The tape measure apparatus as recited in claim 41, wherein the lock comprises a bar pivotally connected to the casing on the two side walls.

45. The tape measure apparatus as recited in claim 44, wherein the bar engages the guide to keep the insert in a retracted position.

46. The tape measure apparatus as recited in claim 41, wherein the lock comprises a clip slidably connected to the casing.

47. The tape measure apparatus as recited in claim 46, wherein the clip engages the guide to keep the insert in a retracted position.

48. The tape measure apparatus as recited in claim 41, wherein the lock comprises a magnet which magnetically engages the insert to resist efforts to move the insert out of the retracted position.

49. The tape measure apparatus as recited in claim 41, further comprising a recess in the front wall wherein the guide can fit flush when the insert is in the retracted position.

50. The tape measure apparatus as recited in claim 41, further comprising a quick release mechanism operatively connected to the insert, the quick release mechanism releasing the insert from the retracted position when the lock is in the unlocked setting.

51. The tape measure apparatus as recited in claim 50, wherein the quick release comprises a button attached to the bottom wall.

52. The tape measure apparatus as recited in claim 51, further comprising a catch attached to the insert base, the catch being configured to resist efforts to pull the insert completely out of the casing enclosure, the catch having an inclined surface, the button comprising an inclined tip which engages the inclined surface of the catch.

53. The tape measure apparatus as recited in claim 52, further comprising an innermost stop which engages the catch to maintain the insert in the retracted position.

54. The tape measure apparatus as recited in claim 41, further comprising a flexible member operatively engaging the insert by tending to cause the insert to move from the retracted toward the extended position.

55. The tape measure apparatus as recited in claim 54, wherein the flexible member comprises a spring attached to the rear wall.

56. The tape measure apparatus as recited in claim 54, wherein the flexible member comprises a flexible bar attached to the bottom wall.

57. The tape measure apparatus as recited in claim 55, wherein the spring operatively engages the base.

* * * * *